US006418381B1

United States Patent
Fuller

(10) Patent No.: US 6,418,381 B1
(45) Date of Patent: Jul. 9, 2002

(54) TRANSFORMATION METHOD APPLIED TO SEISMIC DATA TRACES

(75) Inventor: Brian N. Fuller, Englewood, CO (US)

(73) Assignee: Landmark Graphics Corp., DE (US)

( * ) Notice: Subject to any disclaimer, the term of this patent is extended or adjusted under 35 U.S.C. 154(b) by 0 days.

(21) Appl. No.: 09/455,568

(22) Filed: Dec. 6, 1999

(51) Int. Cl.[7] .............................................. G06F 19/00
(52) U.S. Cl. ........................................ 702/18; 702/16
(58) Field of Search ............................ 702/16, 14, 17, 702/18; 367/68, 72, 25, 47

(56) References Cited

U.S. PATENT DOCUMENTS

| 4,757,480 A | * | 7/1988 | Gutowski | 367/47 |
| 4,951,266 A | | 8/1990 | Hsu | 367/25 |
| 5,850,622 A | * | 12/1998 | Vassiliou et al. | 701/17 |
| 5,892,732 A | | 4/1999 | Gerztenkorn | 367/72 |
| 6,131,071 A | * | 10/2000 | Partyka et al. | 702/16 |

* cited by examiner

Primary Examiner—Edward Lefkowitz
Assistant Examiner—Victor J. Taylor
(74) Attorney, Agent, or Firm—Andrews, Kurth, Mayor, Day, Caldwell & Keeton LLP

(57) ABSTRACT

A method for processing of seismic data traces utilizes the fact that a series of linear operations applied to vectors can be approximated by application of the linear operations to a set of basis vectors which are then scaled and summed. The method is applied to seismic data traces with a reduction in processing time provided that computation time in creating the basis vectors is small relative to the total computation time in applying the method. Theoretically there is much to be gained in terms of processing speed by implementation of this method on a vector processor that is designed to do multiply and accumulate operations quickly.

5 Claims, 5 Drawing Sheets

TRANSFORMATION METHOD APPLIED TO SEISMIC DATA TRACES

BACKGROUND OF INVENTION

1. Field of Invention

This invention relates generally to the field of geophysics and to seismic techniques for producing a representation of a section of the earth. In particular the invention relates to the field of processing methods for transforming original seismic traces to obtain transformed traces and for displaying such transformed traces.

2. Description of the Prior Art

Many of the signal processing methods that are applied to seismic trace data are linear operations, that is, linear transforms. Examples of such transforms are band pass filters, certain types of migration operations, and NMO. Some transform methods are expensive in computer usage terms.

3. Identification of Object of the Invention

A primary object of this invention is to provide a method which speeds up the processing of seismic trace data to obtain a transform function of such trace data.

SUMMARY OF THE INVENTION

The invention provides a method by which the computational time required to apply certain linear operations to seismic data traces can be decreased. The linear transform of a set of data traces can be approximated by the transformation of a smaller number of basis vectors followed by construction of the transform of the original data by simply scaling and summing the transformed basis vectors. For certain linear operations there is a computational savings in transforming the seismic data traces by this method. The linear transformation can be a cascaded set of separate linear operations combined to form the effect of a single linear operation. Examples of application of the method to actual seismic data show that the method works to reduce computation time.

BRIEF DESCRIPTION OF THE DRAWINGS

The objects, advantages, and features of the invention will become more apparent by reference to the drawings which are appended hereto and wherein like numerals indicate like parts and wherein an illustrative embodiment of the invention is shown, of which.

DESCRIPTION OF THE INVENTION

Table I below provides notation examples used below in this specification.

TABLE I

| | |
|---|---|
| $\underline{U}$ | a set of vectors |
| $U_i$ | the i-th vector in the set $\underline{U}$ |
| T | a vector |
| $a_i$ | scalar which multiplies $U_i$ |
| $a_{in}$ | scalar which multiplies the i-th basis vector $U_i$ to construct the vector $T_n$ |

A bold face upper case letter with an underline indicates a set of vectors all with the same number of elements, for example $\underline{U}$. A bold face upper case letter with a subscript indicates a single vector that is one of a set of vectors. The symbol $U_i$, for example, indicates the i-th vector from the set of vectors $\underline{U}$. A bold face upper case letter simply indicates a vector, such as T. A lower case letter with a single subscript indicates a scalar value that is used to scale all of the elements of a vector. The symbol $a_i$, for example, indicates a scalar value used to scale the i-th vector of a set, such as $U_i$. A lower case letter with a double subscript, $a_{in}$, indicates a scalar value that multiplies the i-th basis vector to construct the n-th vector in a set of vectors.

It is known from basic linear algebra that a vector, T, can be constructed from a set of scaled orthonormal basis vectors, $\underline{U}$, according to Equation (1).

$$T = \sum_i a_i U_i \tag{1}$$

where $a_i$ is a scalar that multiplies the elements of the i-th basis vector $U_i$. The basis vectors, $\underline{U}$, span the space that contains T.

In filter theory a linear operation, F( ), that operates on a vector V to generate another vector X (i.e., F(V)=X) has both multiplicative and distributive properties as in Equations (2) and (3).

$$F(kV)=kF(V) \tag{2}$$

$$F(V+X)=F(V)+F(X) \tag{3}$$

In Equations (2) and (3) V and X are vectors, and k is a scalar value for multiplication.

It follows from Equations (1), (2), and (3) that the basis vectors $U_i$, used to construct the vector T in Equation (1) can be transformed by an operator F( ), scaled, and then summed to result in F(T) as in Equation (4).

$$F(T)=F(\Sigma a_i U_i)=a_1 F(U_1)+a_2 F(U_2)+a_3 F(U_3)+\ldots+a_n F(U_n) \tag{4}$$

where n is the number of basis vectors used in the reconstruction.

Application of the Method to Seismic Data

Figure 2:
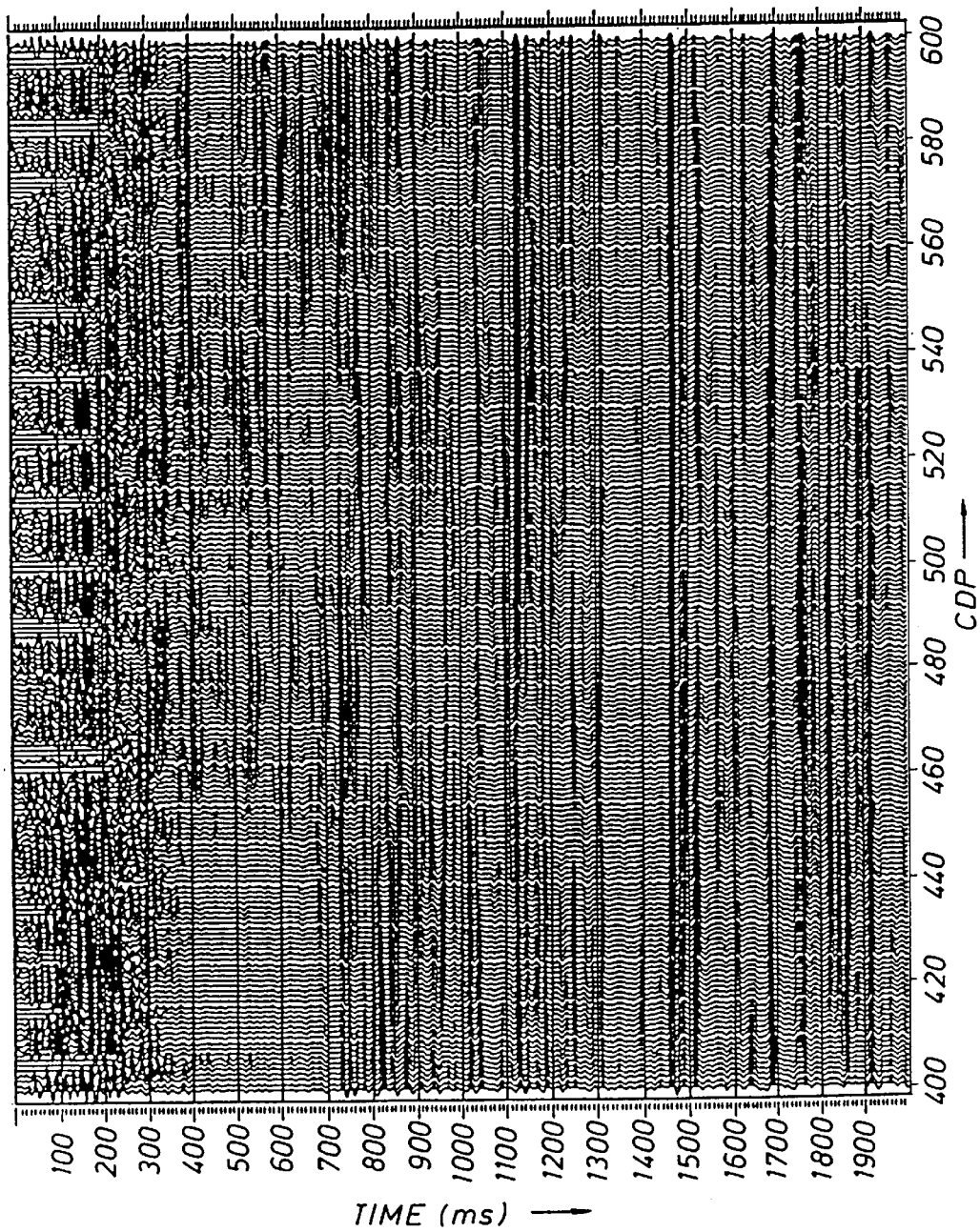
FIG. 2 is an actual 2D common-offset gather of 200 CDP seismic traces.

The first step of the method for producing a graphical image of an earth's formation is to record a set of seismic traces along a line on the earth's surface by conventional methods. Each trace is a waveform signal as a function of time which includes information about boundaries between geologic formations. Each trace is digitized for recording, but can be converted to an analog signal and recorded as a function of time as illustrated in FIG. 2. Thus, a set of seismic data traces is recorded for further processing according to the invention.

An operator F( ), for example, a band pass filter, is to be applied to a set of k seismic data traces, $T_1$ through $T_k$, where the subscript indicates the number of the data trace in the dataset. FIG. 2 shows 200 seismic data traces. According to Equation (4), the result of the operation on the trace $T_n$ can be achieved by scaling a set of basis vectors, $\underline{U}$, that have been operated on by F( ). The basis vectors, $\underline{U}$, of the seismic data traces $T_1$ through $T_k$ can be used to construct of the K vectors $T_n$ by Equation 5.

$$T_n = \sum_i a_{in} U_i \qquad (5)$$

where $a_{in}$ is a scalar that is used to multiply the i-th basis vector, $U_i$, to construct the vector $T_n$. Application of Equation 4 to this case gives $$F(T_k)=F(\Sigma a_{ik}U_i)=a_{1k}F(U_1)+a_{2k}F(U_2)+a_{3k}F(U_3)+ \ldots +a_{nk}F(U_n) \qquad (6)$$

where n is the number of basis vectors used to construct $F(T_k)$. The operation on all of the vectors $T_i$, can then be achieved by application of F( ) to each of the basis vectors followed by scaling and summing of the transformed basis vectors with the appropriate $a_{ik}$ values.

It is important to point out that if the basis vectors, $\underline{U}$, are carefully selected, then the number of basis vectors used in Equation (6) can be small, thus minimizing computer time used to perform the computations. As shown below, the cost in computer time of applying the linear transform F( ) to a set of data traces can be greater than the cost of calculating the basis vectors plus the cost of transforming the basis vectors plus the cost of scaling the transformed basis vectors. The cost per trace is minimized for increasingly large data sets, because the basis vectors only need to be computed a single time. The remainder of the computation time is spent in scaling and summing the basis vectors which are generally inexpensive computer operations.

The effect of applying Equation (6) to all of the data traces is that the same linear operation is performed on all of the data traces. For example, the same band pass filter with the same filter parameters might be applied to all data traces. The method described above may not be efficiently applied if the operation changes substantially from one trace to the next.

Processing Flow

The processing work flow is demonstrated below, and an illustrative flow diagram is presented in FIG. 1.

(1) After seismic traces are collected and recorded as indicated by logic flow box 5, processing continues as indicated by logic flow box 10 to calculate n orthonormal basis vectors, $U_1$ through $U_n$, from the set of k seismic data traces $T_1$ through $T_k$. The details of the basis vector calculation are presented below.

(2) Next, as indicated by logic box 20 scalar multipliers $a_{in}$ are calculated as indicated by Equation (5). For each of the k data traces, $T_1$ through $T_k$, n coefficients are calculated one coefficient to scale each of the basis vectors. In the end, there are k times n coefficients which are stored on computer disk.

(3) Next, the transform F( ) is applied to each of the n basis vectors to create a set of transformed basis vectors. This step is indicated in logic flow box 30. An individual basis vector might be transformed into a single vector or into a multidimensional array of two or more traces. The result of the transformed k-th basis vector $V_k$, in other words is $F(U_k)=V_k$.

(4) For each trace $T_k$ in the original data set, the transform of $T_k$ is produced by the basis vectors with the appropriate $a_{ik}$ by computing $$F(T_k) = \sum_{i=1,n} a_{ik} V_i. \qquad (7)$$

This step is indicated in logic flow box 40.

Choice of Basis Vectors

Figure 3:
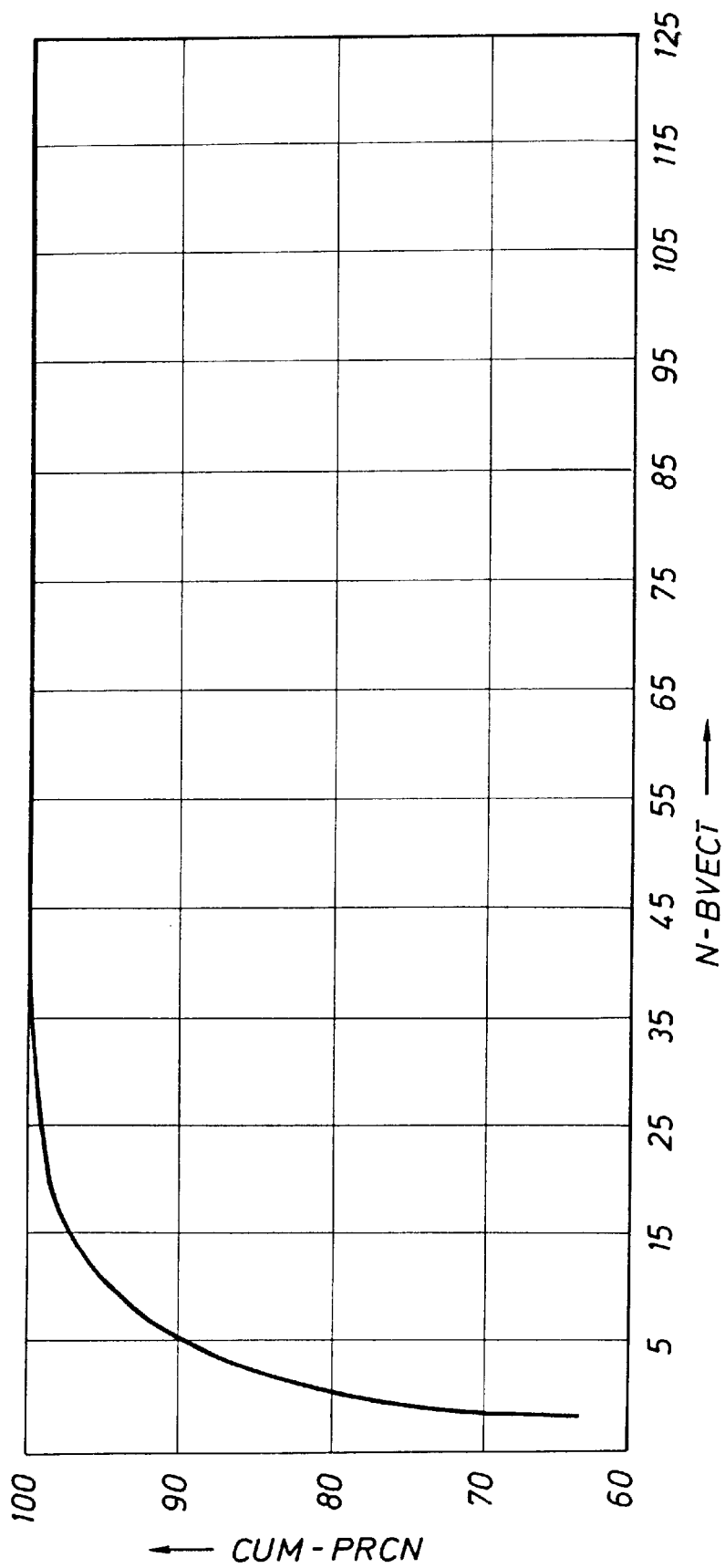
FIG. 3 illustrates cumulative variance of the input data of FIG. 2 after a covariance matrix was calculated from the data traces.

The basis vectors that are preferred for seismic trace data are eigenvectors calculated from the covariance matrix of all of the data traces in the input dataset. The covariance matrix, C, is calculated as in Equation (8), $$C_{ij} = \sum_i \sum_j D_{ik} D_{jk} \qquad (8)$$

where $D_{jk}$ is the j-th sample of the k-th data trace. The reason for using eigenvectors as basis vectors stems from the desire to minimize the number of basis vectors in order to minimize computational time. Calculating eigenvectors from $C_{ij}$ in Equation (8) yields basis vectors that express a given fraction of the variance in the dataset using a minimum number of basis vectors (Devijiver and Kittler, 1982, *Pattern Recognition of a Statistical Approach*; Prentice/Hall). FIG. 2 shows a 2D common-offset gather of 200 CDP data traces with a nominal offset of 1000 m. A covariance matrix was calculated from the data traces of FIG. 2 in the window between 400 ms and 2000 ms (800 samples) and the 110 eigenvectors were calculated and output. FIG. 3 shows a plot of cumulative variance of the input data expressed as a function of the eigenvector number. In this case, 9 of the original 110 eigenvectors account for 95% of the variance in the data and 23 eigenvectors account for 990% of the variance. This is the same as saying that the original data could be reconstructed from the eigenvectors with 95% of the variance still intact in the data by using 9 of the eigenvectors. There is some loss in fidelity in the reconstructed data. If a given amount of loss is unacceptable, then the data can be reconstructed using more of the basis vectors, but such procedure takes more computer time.

Application to Data Processing Flows

In this section the processing flow outlined above is described in detail for seismic data traces. The processing flow was first conducted using prior art processing methods with typical seismic trace processing functions:

Bandpass Filter (frequency domain),

Normal Moveout Correction (a single velocity versus time function), and

Bandpass Filter (time domain, 20 filter coefficients).

Figure 1:
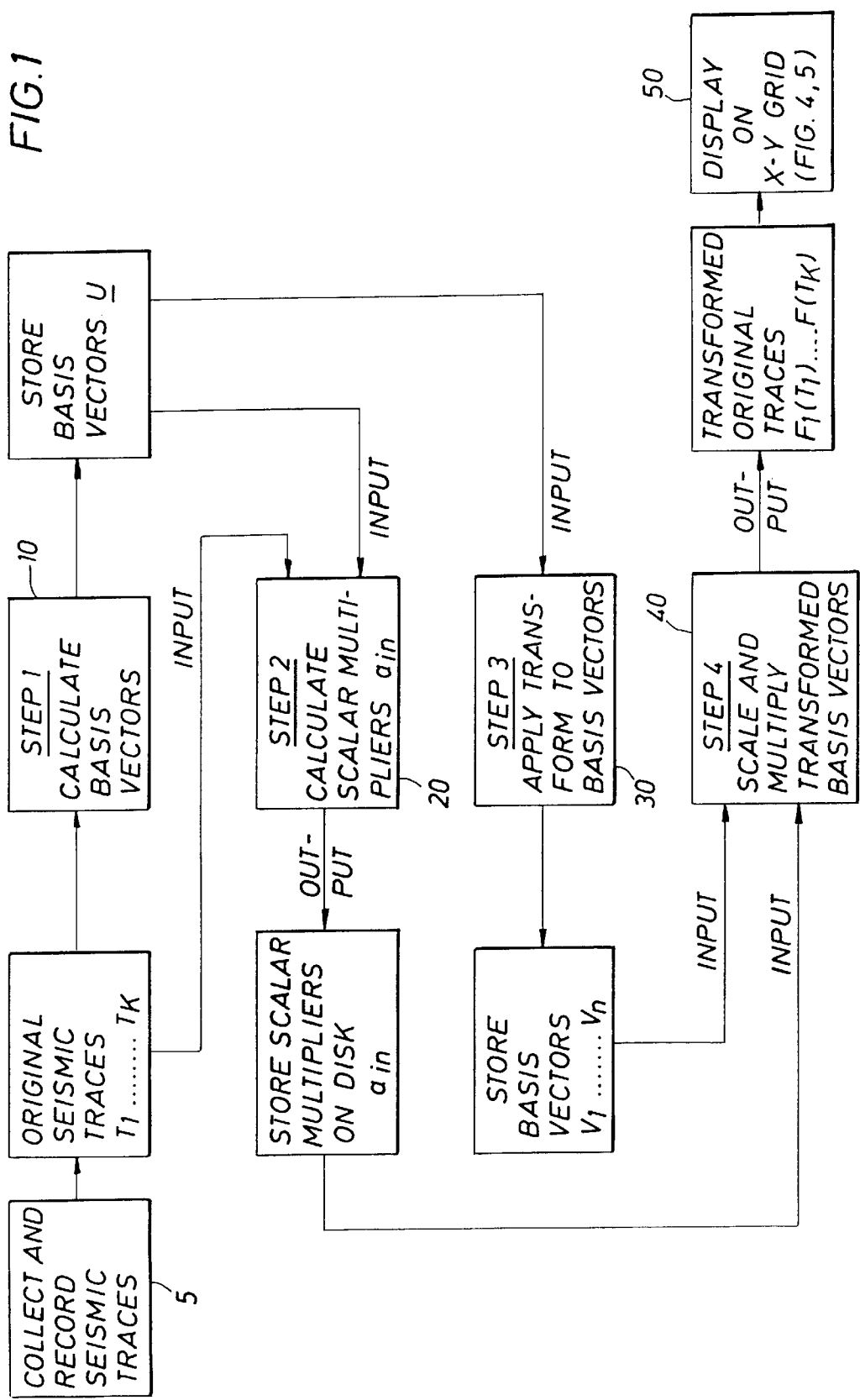
FIG. 1 is a flow diagram of the steps of the method of the invention.
Figure 4:
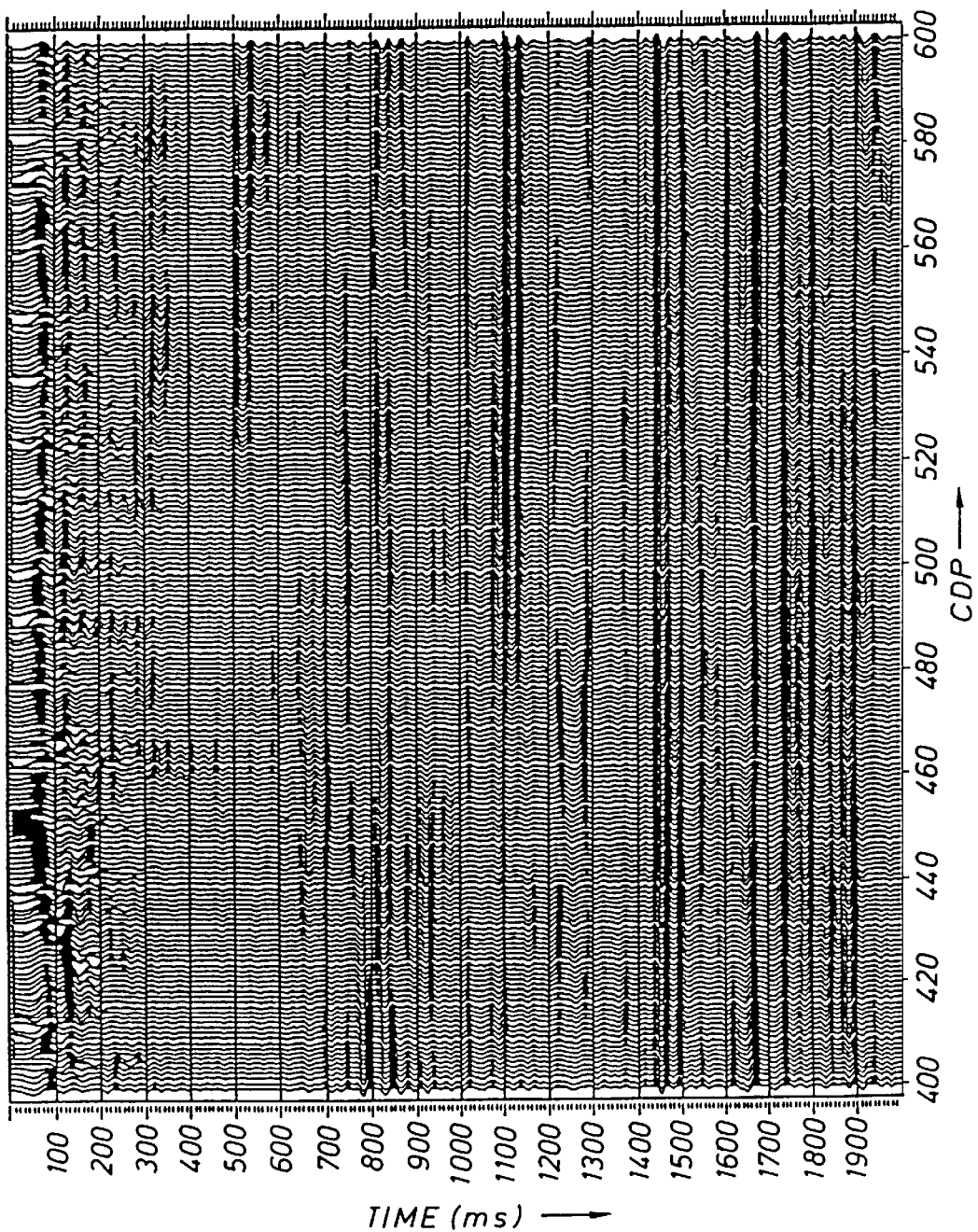
FIG. 4 shows the seismic trace data after transformation using conventional prior art methods of trace data transformation.
Figure 5:
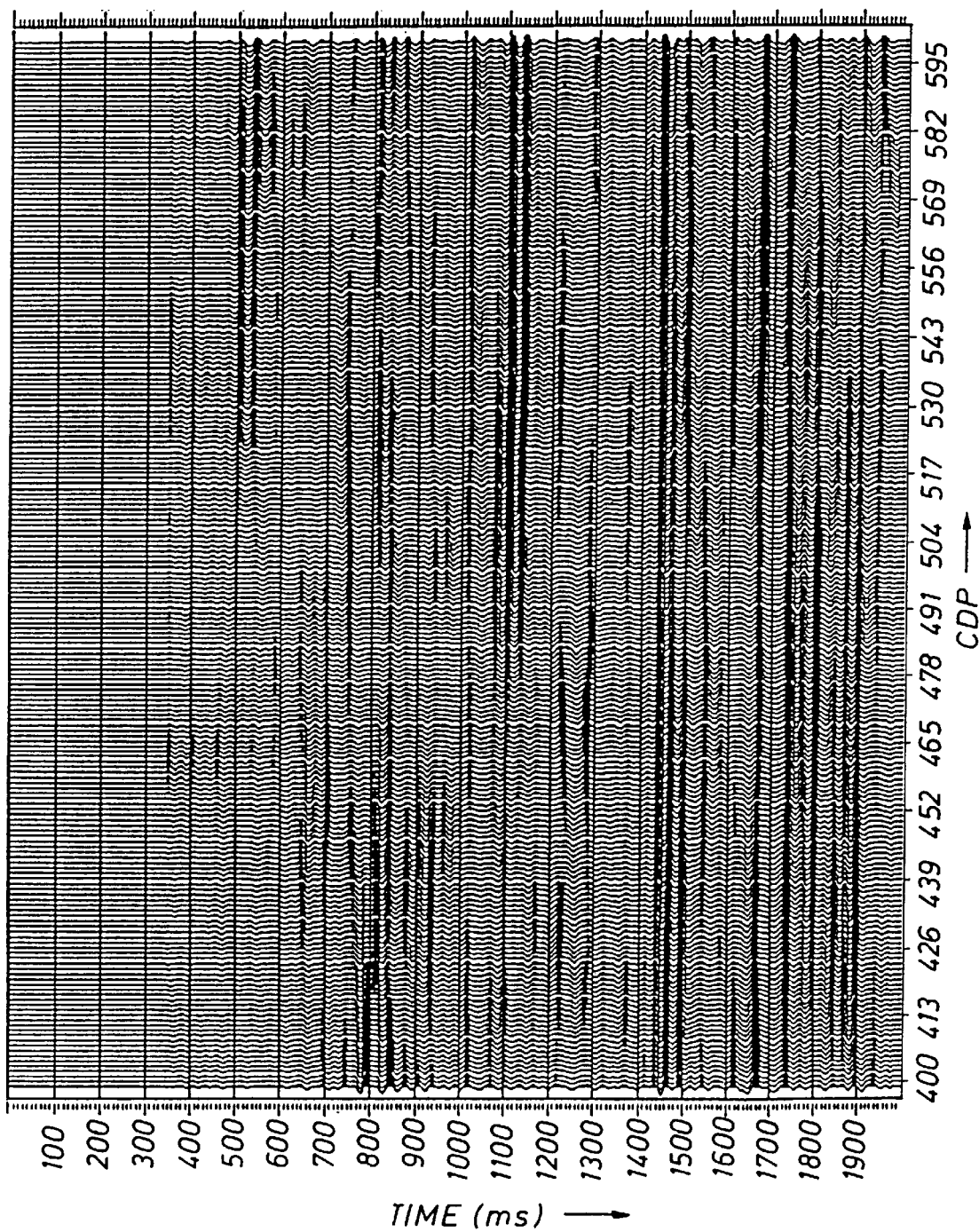
FIG. 5 shows the seismic trace data after transformation using 23 basis vectors of the covariance matrix.

The final step of the process is to display the transformed traces on an x-y grid, as illustrated by logic box 50 of FIG. 1 and as demonstrated in the graphical displays of FIGS. 4 and 5.

FIG. 4 shows the data in FIG. 2 after application of the prior art processing flow. FIG. 5 shows the same 200 data traces as in FIG. 4 except that they were constructed according to the processing flow steps of this invention as illustrated in FIG. 1 while using 23 basis vectors. The 23 basis vectors accounted for 99% of the variance in the data. The CPU time used to run the data traces by prior art techniques to generate the traces in FIG. 4 was 2.0 CPU seconds, while the CPU time to reconstruct the filtered data for FIG. 5 was 0.8 CPU seconds, a time savings of just over one half Because only a small percentage of the information is lost between FIGS. 4 and 5, the two are visually very similar. There is no signal above 400 ms in FIG. 5, because the basis vector extraction included only data from 400 to 2000 ms. In a separate trial, 9 basis vectors were used which accounted for 95% of the variance. The result was visually almost identical to FIG. 5 and only 0.4 CPU seconds were used in the construction.

Hardware Improvements

The computations described above were performed on a scalar computer (IBM RS6000/580) which is to say that all of the multiply and add operations are performed one vector sample at a time. Maximal use of this method could be made, however, if hardware circuitry were available to multiply all of the samples in a vector by a scalar and then accumulate the result in a single machine cycle. The application of this method to seismic data processing and analysis would then be very efficient. For example, velocity analysis is often done using constant velocity stacks or semblance computations for different velocity functions. Rather than repeatedly applying NMO to all of the data traces under analysis, different NMO functions can be repeatedly applied to a single small set of basis vectors, and the NMO'ed final traces can be quickly constructed by scaling and summing the NMO'ed basis vectors. If the multiply and add operations are done on an entire vector in a single machine cycle, the speed up realized is proportional to the number of samples in the data traces, which commonly would be a factor of 1000 or more.

Computation Time For Basis Vectors

The computation time to derive the basis vectors in the example described above was 141 CPU seconds using the Eispack routine called rs. In the example given above, more time was taken in calculating the basis vectors than in just applying the processing flow to the seismic data. If this was the final result then there would be no advantage to doing processing data by basis vectors. However, as mentioned above, the basis vectors only need to be computed one time. So if an interactive velocity analysis were being performed on the seismic data in which repeated velocity functions were applied to the seismic data, then the initial computation time cost of calculating the basis vectors diminishes relative to the total computation time used during the velocity analysis. Additionally, the speed-up in application improves the interactivity of the analysis software and is a better use of the computer user's time.

It is not necessary that the basis vectors be computed by the method described above according to Equation (8). Output from the Fourier Transform, for example, can be used to generate the amplitude and phase spectrum of a data trace which can be viewed as a set of scaled sinusoidal basis vectors with a time shift (phase shift) that can be determined from the phase spectrum. There are much faster ways to calculate the eigenvectors of the covariance matrix in Equation (8), but the method presented above shows that the basis vector scaling method could be used.

What is claimed is:

1. A method of producing a representation of a cross section of subterranean geologic formations comprising the steps of, recording a set of seismic traces along a line on the earth's surface, each trace being a waveform signal as a function of time which includes information about boundaries between subterranean geologic formations, determining basis vectors from said set of seismic data traces;

performing at least one seismic processing operation on each of said basis vectors to produce processed basis functions;

recording said processed basis functions;

scaling the processed basis functions to produce scaled processed basis functions;

summing said scaled processed basis functions to produce a transformed set of seismic data traces, and displaying said transformed set of seismic data traces on an x-y grid, whereby an improved visual representation of a cross section of the earth's crust is presented.

2. The method of claim 1 wherein, said basis vectors are eigenvectors determined from the covariance matrix of the seismic data traces from said set of seismic data traces.

3. The method of claim 1 wherein, said scaling step employs scalar multipliers $a_{in}$ determined from the equation, $$T_n = \sum_i a_{in} U_i,$$

where $T_n$ represents the nth trace in a set of seismic traces, and $U_i$ represents the ith basis vector in a set of $\underline{U}$ of basis vectors.

4. The method of claim 1 wherein, the number of basis vectors is less than or about equal to ten percent of the traces of said set of seismic data traces.

5. The method of claim 1 wherein, said basis vectors are determined from the output of the Fourier Transformer applied to each trace of said set of seismic data traces.

* * * * *